(No Model.)
C. C. ISSENHUTH.
FOUR HORSE EVENER.
No. 384,167. Patented June 5, 1888.
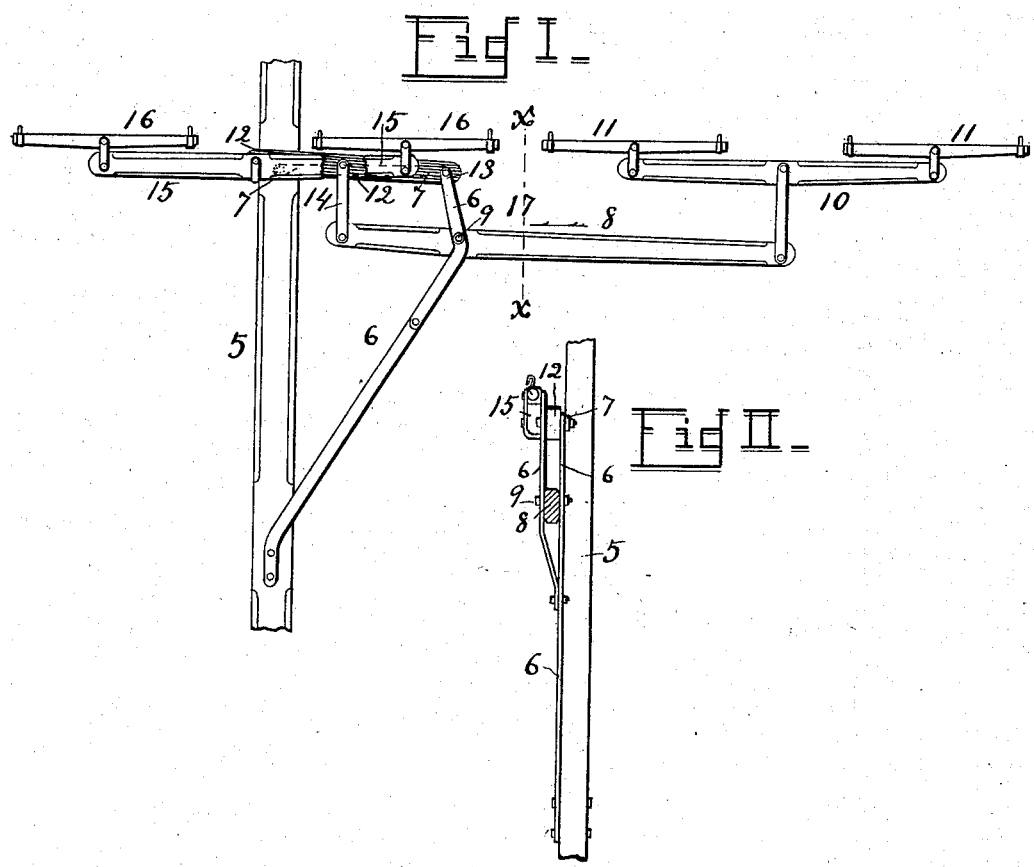
Witnesses
S. E. E. Stevens.
P. E. Stevens.
Inventor
Charles C. Issenhuth.
By his Attorney W. X. Stevens.

UNITED STATES PATENT OFFICE.

CHARLES C. ISSENHUTH, OF HURON, DAKOTA TERRITORY.

FOUR-HORSE EVENER.

SPECIFICATION forming part of Letters Patent No. 384,167, dated June 5, 1888.

Application filed August 6, 1886. Serial No. 210,194. (No model.)

*To all whom it may concern:*

Be it known that I, CHARLES C. ISSENHUTH, a citizen of the United States, residing at Huron, in the county of Beadle and Territory of Dakota, have invented a new and useful Improvement in Draft-Equalizers, of which the following is a specification.

This invention relates to that class of four-horse eveners in which three of the horses travel at one side of the team-pole and one horse at the other side; and its object is to provide means whereby the draft may be equalized upon all the horses.

To this end my invention consists in the construction and combination of parts forming a four-horse evener, hereinafter described and claimed, reference being had to the accompanying drawings, in which—

Figure I is a plan view of my invention with one of the doubletrees partly broken away to expose one of the evener-levers below; and Fig. II is a vertical section of the same at the line x x, looking toward the pole.

No. 5 represents the team-pole, which may belong to a mowing-machine, a reaper, a plow, a wagon, or to any other similar implement.

6 is an iron brace secured at its rear end to the pole 5 and projecting to one side thereof.

7 (shown in dotted lines in Fig. 1) is a cross-tie rigidly connecting the forward end of the brace with the pole, thereby making the brace a bracket in unity with the pole.

8 is one of my evener-levers, pivoted eccentrically at 9 to the brace 6, and having connected with its long arm a doubletree, 10, and two singletrees, 11, whereby two horses may be attached, both at one side of the pole.

12 is the other evener-lever, pivoted at one end, 13, to the brace 6, and connected midway by ties 14 with the short arm of the lever 8, and having attached to its other end a doubletree, 15, carrying two singletrees, 16, whereby two more horses may be attached, one at each side of the pole. By this means the pole is guided between the last two horses mentioned while all four horses are pulling forward upon the brace.

It would seem on inspection of the drawings that the two levers 8 and 12 act as one lever pivoted at 9, and that the brace should be extended to bring the pivot 9 to the dotted line 17, exactly half-way between the two spans of horses; but I obviate the necessity of extending the brace so far to one side of the pole by making the short arms of the two levers of unequal lengths and by making the long arms also of unequal lengths, and proportioning these different lengths, as required, to balance the draft of the two spans of horses on the point 9. At the pivot 13 there is no draft, but, on the contrary, a backward pressure of the lever 12, its draft being exerted on the connection 14.

Having thus fully described my invention, what I desire to secure by Letters Patent is the following:

1. The combination, with a team-pole, 5, of a brace, 6, secured at one end thereto, a tie, 7, rigidly connecting the other end of the brace with the pole, a lever, 8, eccentrically pivoted to the said brace, the lever 12, pivoted at one end to the same brace, and a tie, 14, connecting the short arms of the said levers, the long arms of the levers extending in opposite directions from the brace 6, and provided at their outer ends with means for attaching horses, substantially as shown and described.

2. The combination of the team-pole 5, the brace 6, rigidly connected at both ends therewith, the lever 8, eccentrically pivoted to the brace, with its long arm extending outward therefrom and provided with means for attaching horses, and with its short arm extending toward the team-pole, the lever 12, pivoted at one end to the said brace at a point forward of the lever 8 and extending across the team-pole, a tie, 14, connecting the short arms of the two levers, a doubletree, 15, centrally pivoted to the outer end of the lever 12 and extending across the team-pole, and singletrees 16, attached to the said doubletree, one at each side of the pole, substantially as shown and described.

CHARLES C. ISSENHUTH.

Witnesses:
S. W. ROBERTS,
H. J. BINGHAM.